Nov. 25, 1958  H. E. SNYDER  2,861,381
FISHING LURE
Filed Jan. 27, 1955
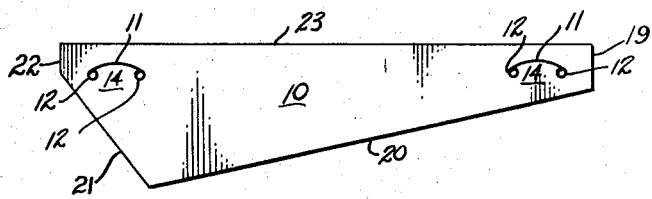
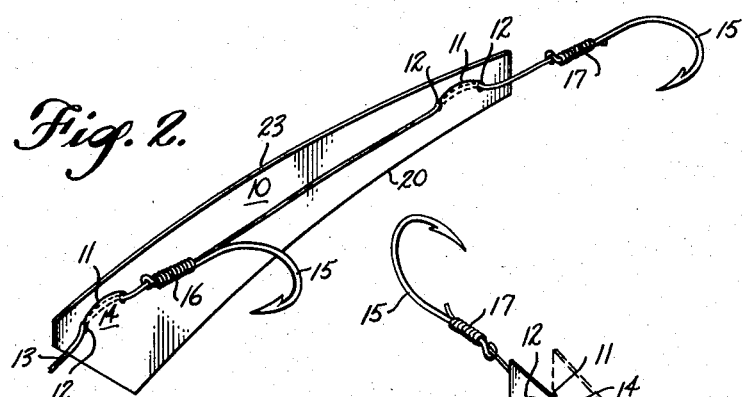
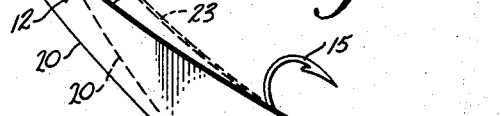
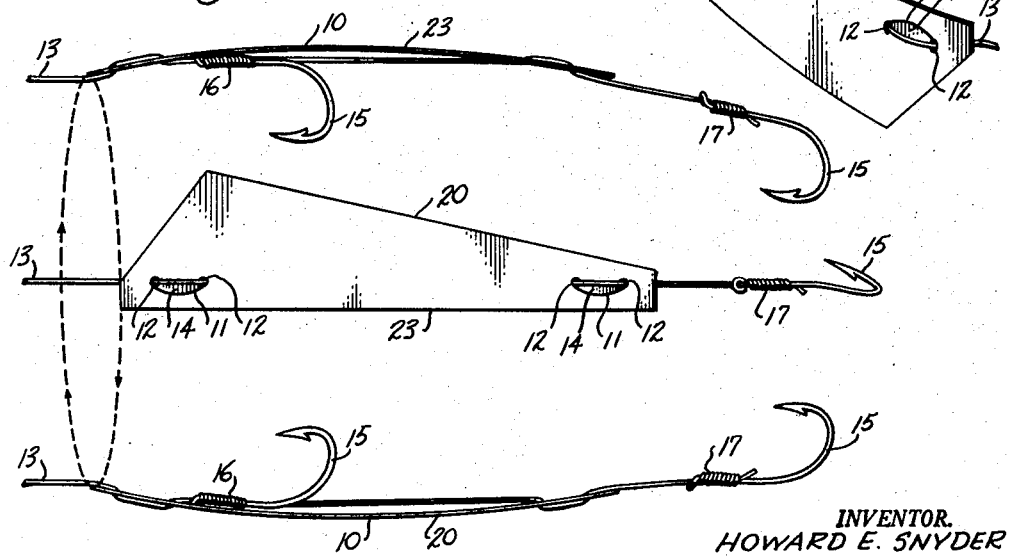
INVENTOR.
HOWARD E. SNYDER
BY Roy E. Mattern Jr.
ATTORNEY

2,861,381
FISHING LURE

Howard E. Snyder, Mercer Island, Wash.

Application January 27, 1955, Serial No. 484,340

2 Claims. (Cl. 43—42.36)

This invention relates to artificial fish lures and more particularly to a lure that represents a small fish or portion of a fish used as bait such as a herring.

The principal object of the invention is to provide a lure that will give a fisherman results on a par with those obtained using natural bait at minimum cost and avoiding many of the inconveniences associated with the use of natural bait.

Other objects of the invention are to provide:

A lure easily and quickly attached to the line or removed therefrom by using attachment means that eliminate the need for tying knots in the line, threading line through holes, using hardware such as snaps, swivels, rings, etc., A lure of such low cost that its loss represents a negligible expense, A lure economically made from stampings without the necessity of rework, A lure easily adjustable to acquire the desired motion through water, A lure having a structure permitting several to be packaged for transportation to the fishing ground in the fisherman's pocket, A lure of light weight to avoid interference with the hooked fish, and A lure suitable for different types of fishing known as: mooching, spinning, stripping, casting, trolling, surf, and still fishing.

These objects are accomplished by fabricating from initially flat relatively thin material, a lure that may be secured to the line or leader without tying and spins through the water simulating in appearance the darting movements of a fish.

The invention will become more evident as the following detailed description is read in conjunction with the accompanying drawings, in which:

Figure 1 is a side view of the lure body after preliminary fabrication by cutting or stamping, Figure 2 is a perspective view of the lure body adjusted by bending and secured to a line or leader, Figure 3 is a perspective view of the lure indicating in dotted lines the range of variance in the degree of curvature determined by the speed at which the lure travels through the water, and Figure 4 is a view depicting the rotary or spinning motion of the lure.

Referring to the drawings, Figures 1 through 4, illustrate the embodiment which represents the preferred form of the very inexpensive but highly effective lure.

The body 10 of the lure is made from any material not damaged by prolonged submersion in water, fresh or salt, and which can be cut, punched, bent and otherwise formed by conventional means economically undertaken. Such materials are aluminum alloys properly heat treated for fabrication by one machining operation without requiring rework to eliminate burrs or other edge irregularities that might abraid the leader or line. Also these alloys will not corrode.

The shape of the body 10 can be varied somewhat. However as illustrated in Figure 1 the body serves to simulate the main body section of a fish such as a herring. At the forward end of the body 10, the divergence of the top edge 23 and the bottom edge 20 is at a maximum. The leading or front edge of the body 10 is primarily on a bias 21 slanting rearwardly from just below the top edge 23 to the bottom edge 20, after commencing at 22 substantially perpendicular to the top edge 23. The rear or trailing edge 19 is substantially perpendicular throughout to the top edge 23.

Each end of the body 10 has a place of attachment. A narrow slot 11 is cut on an arc commencing and terminating at a hole 12 large enough to receive line or leader. Tabs 14, equally spaced from the top edge 23 of the body 10, result from the formation of the narrow slots 11.

Hooks 15 are secured directly to the line or leader 13 by a slip coil knot 16 and a terminal coil knot 17 and arranged so that one is positioned alongside of the body 10 and the other to the rear. Other arrangements of the hooks are optional.

Referring to Figure 2, a portion of the line or leader 13, at both places of attachment to the body 10, is passed over tags 14, formed by the slots 11 and bent out of the plane of the body 10, and slidably secured to the body 10 as the tabs 14 are moved back into the plane of the body 10. Removal is accomplished just as quickly by altering the position of the tabs 14.

Constructed in this manner the lure embodies the objectives of the invention whereby the fisherman is provided with a very inexpensive yet highly effective lure. One that he can rig with his fingers in a minimum time adjusting its longitudinal shape creating just the right amount of bow to acquire the spinning action necessary to attract the fish. He can carry several of the lure bodies, arranged side by side, or prerigged lures in one of his pockets or tackle box for current use. When the immediate time arrives for catching fish, the lure is quickly taken in hand and attached to the line or leader 13. As on the spot adjustment is made by bending the body 10 so the lure will spin in the water as depicted in Figure 4.

The rate of spinning is controlled by adjustment of the bow as indicated in Figure 3, the dotted lines representing a more pronounced bow that results in a higher spinning rate. There is a self-adjustment feature that is notable where very thin materials are used for the body 10. As the speed through the water increases the bow flattens and the rate of spinning does not increase remaining substantially uniform. When heavier materials are used the bow is changed by the fisherman for the best spinning results at the speed currently selected during the fishing outing.

As suggested previously, the lure lends itself to pre-rigging and packaging for the fisherman who carries or buys his tackle on a ready to use basis.

The natural finish of the body material, as for example the finish of aluminum alloys, will be sufficient to attract most species of fish. However, when suitable in certain fishing grounds, designs and/or colorings are employed to increase the attractiveness of the lure.

I claim:

1. A fishing lure for rapid attachment to and release from a continuous portion of line carrying hooking means, comprising a fish-like body formed from thin handable material having a front edge on a bias slanting rearwardly from top to bottom, a straight top edge, a rear edge substantially perpendicular to the top edge, and a bottom edge on a bias slanting upwardly from said front edge and bendable line attachment means derived from and integral with the body spaced from one another and equally spaced from the top edge to receive a continuous line holding the lure to the line by frictional means, 2. In combination with a continuous fishing line terminating in a hooking means, a fishing lure-body for easy, removable, attachment to the continuous line without altering the line, comprising a fish-like body of thin bendable material having a front edge on a bias slanting rearwardly from top to bottom, a straight top edge, a rear edge substantially perpendicular to the top edge, and a bottom edge on a bias slanting upwardly from said front edge, and bendable line attachment means derived from and integral with the body spaced from one another and equally spaced from the top edge to receive the continuous line holding the lure to the line by frictional means.

References Cited in the file of this patent

UNITED STATES PATENTS

| | | |
|---|---|---|
| 1,570,291 | Van Alstine | Jan. 19, 1926 |
| 2,050,175 | Grabner | Aug. 4, 1936 |
| 2,375,290 | Docteur | May 8, 1945 |
| 2,514,938 | Craig | July 11, 1950 |
| 2,608,788 | Niemi | Sept. 2, 1952 |

FOREIGN PATENTS

| | | |
|---|---|---|
| 5,809 | Great Britain | Apr. 1, 1884 |
| 114,782 | Sweden | Sept. 4, 1945 |
| 505,400 | Canada | Aug. 31, 1954 |